3,347,870
ARYL-TETRALYL COMPOUNDS AND A
PROCESS FOR THEIR PRODUCTION
Jürg Rutschmann, Oberwil, Basel-Land, and Emil Schreier, Basel, Switzerland, assignors to Sandoz Ltd. (also known as Sandoz A.G.), Basel, Switzerland
No Drawing. Filed Aug. 28, 1963, Ser. No. 305,185
Claims priority, application Switzerland, Aug. 30, 1962, 10,318/62
6 Claims. (Cl. 260—340.5)

The present invention relates to new aryl-tetralyl compounds. The term "aryl-tetralyl compounds" denotes 1-aryl-1,2,3,4-tetrahydronaphthyl compounds.

The present invention provides aryl-tetralyl compounds of Formula I,

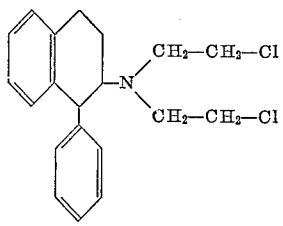

in which one or both aromatic rings may be substituted with one, two or three lower (i.e., $C_1$–$C_4$) alkoxy radicals or with a methylenedioxy radical, acid addition salts of these compounds, and pharmaceutical compositions containing, in addition to an inert carrier, a compound I or said salt thereof.

The present invention also provides a process for the production of compounds I above, and their acid addition salts, which comprises chlorinating a bis-β-hydroxyethyl-amine derivative of Formula IV,

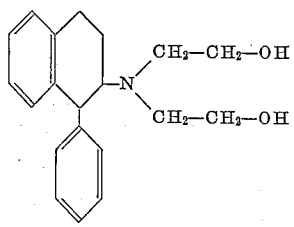

in which the aromatic rings may be substituted as the compounds of Formula I,
or an acid addition salt thereof. It would, of course, be possible, and this is included in the scope of the present invention, to produce the acid addition salts of the compounds I from the free base by reacting with an acid, for example hydrochloric, hydrobromic, sulphuric, citric, tartaric, succinic, maleic, malic, acetic, benzoic, hexahydrobenzoic, methanesulphonic, fumaric, gallic and hydriodic acid.

The compounds IV above may be produced by condensing a compound of Formula III,

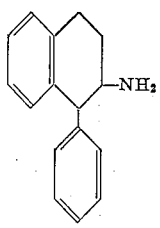

in which the aromatic rings may be substituted as the compounds of Formula I,
with ethylene oxide.

The compounds III above may be obtained by converting a compound of the Formula II,

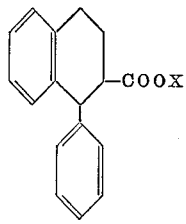

in which the aromatic rings may be substituted as the compounds of Formula I and
X denotes a hydrogen atom or an alkyl radical,
using a known method for converting an acid or ester to the corresponding amino compound, to give the required 1-aryl-2-amino-tetraline of the Formula III above.

Some of the 1-aryl-tetraline-2-carboxylic acids and esters of the Formula II are known compounds. For example, 1 - (3',4' - dimethoxyphenyl) - 6,7 - dimethoxy-tetraline-2-carboxylic acid and its esters, may be obtained by reduction of the corresponding 4-oxo compounds. The same method of synthesis may be used to produce other tetraline-carboxylic acids of Formula II, which are as yet unknown.

The conversion of the 1-aryl-tetraline-2-carboxylic acids II into the 1-aryl-2-amino-tetralines III can be effected, for example, by a Curtius decomposition of the corresponding carboxylic acid hydrazides. The acid hydrazides may be obtained by reaction with hydrazine of the acid chloride or reactive ester or mixed anhydride in a suitable inert solvent, or by hydrazine-splitting of the methyl or ethyl ester.

The diazotization of the carboxylic acid hydrazide provides the corresponding azide which may be isolated from the reaction mixture by shaking with an organic solvent which is not miscible with water. Further purification is unnecessary, conversion to the isocyanate being effected directly by the Curtius rearrangement either in the presence of water or dilute, mineral acid leading to the free primary amine or the acid addition salt respectively, but this method, in addition to the desired amines, leads to urea derivative formation, sometimes in considerable quantities. Instead of the Curtius rearrangement, it is possible to convert the azide to the corresponding methyl urethane by heating in methanol and to saponify this readily produced compound to give the amines, though relatively drastic reaction conditions must be used and only low yields are obtained. Better yields of amines are obtained by converting the azide to the corresponding benzylurethane in a suitable solvent, e.g., benzene, toluene or xylene, in the presence of benzyl alcohol, and debenzylating the resulting benzyl urethane with catalytically activated hydrogen, for example with palladium on active charcoal in glacial acetic acid, to give the primary amine III after spontaneous decarboxylation.

The amine III may be readily condensed in methanol with two mols of ethylene oxide to form a bis-β-hydroxyethylamine derivative IV which gives the hydrochloride of compound I on treating with thionyl chloride. A purer end product in better yields may be obtained by chlorinating the compound IV in the form of an acid addition salt, e.g., the hydrochloride, in a solvent, e.g., ether, methylene chloride or chloroform, with thionyl chloride at a temperature from room temperature to that at which the solvent boils.

The hydrochlorides of compounds I crystallize readily and are sparingly soluble in most organic solvents. On heating the hydrochloride of a compound I in benzene, alcohol or methanol or by filtering the solution through a suitable adsorption agent, e.g., aluminium oxide or silica

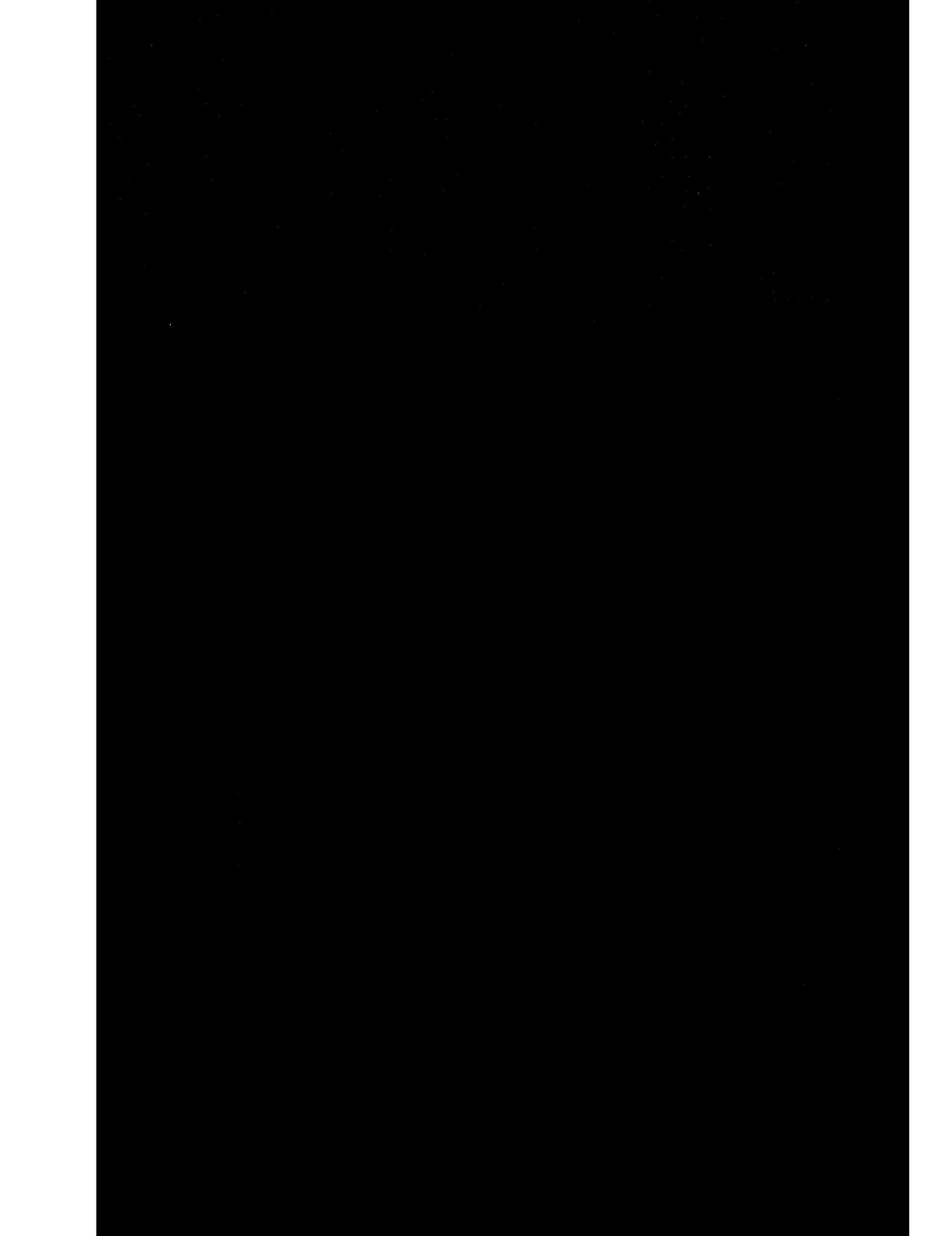

ple 1(b). After treatment with benzyl alcohol in toluene, this provides the *benzylurethane*; M.P. 178–179° C. from alcohol.

In the hydrogenolysis of benzylurethane in glacial acetic acid, which is carried out in a similar manner, the amine is obtained in the form of a viscous colorless oil which distills over in a high vacuum at 180°. The amine crystallizes from methanol/water and has a melting point of 109–111° C. The *hydrochloride* crystallizes from water and has a melting point of 278–280° C.

(2) 4.16 g. of 1 - (3′,4′,5′ - trimethoxyphenyl)-6,7-dimethoxytetraline-2-carboxylic acid hydrazide (10 millimoles) are diazotized as described in Example 2(b)(1). The acid aqueous solution of the azide is poured into 250 cc. of boiling 2 N hydrochloric acid, boiled while stirring for a further 15 minutes, cooled, rendered alkaline with caustic solution and the reaction mixture extracted with chloroform. After washing and drying the chloroform extract, the solvent is evaporated off. A sparingly soluble neutral substance crystallizes from chloroform-alcohol; M.P. 255–256° to which the composition of a symmetrically substituted bis-[1-(3′,4′,5′-trimethoxyphenyl)-6,7-dimethoxy-tetralyl-(2)]-urea must be ascribed, on the basis of elementary analysis and spectra. The hydrochloride of the tetralylamine crystallizes from the mother liquor of the urea after rendering acid to Congo red indicator with hydrochloric acid; on recrystallizing from water, its melting point is 277–279° C. The hydrochloride produced in this way is identical with the product produced by Curtius decomposition via benzylurethane (c.f., Example 2(b)(1)).

(3) 4.16 g. of 1-(3′,4′,5′-trimethoxyphenyl)-6,7-dimethoxy-tetraline-2-carboxylic acid hydrazide (10 millimoles) are converted into the azide as described in Example 2(b)(1). The crude azide is dissolved in 20 cc. of methanol and the solution boiled under reflux for 3 hours. The methylurethane commences to crystallize on reducing the volume of the solution; it has a melting point of 190–191° C. after recrystallization from chloroform alcohol. 2 g. of methylurethane are boiled under reflux in 40 cc. of alcohol and 40 cc. of 40% sodium hydroxide solution overnight. The reaction mixture is then rendered acid to Congo-red by adding dilute hydrochloric acid and the acid solution heated for 15 minutes on a water bath. After cooling, the neutral components are removed by extraction with chloroform, the aqueous phase is then rendered alkaline and the amine isolated by shaking out with chloroform; M.P. 109–111° C. from methanol-water.

(c) *1-(3′,4′,5′ - trimethoxyphenyl) - 6,7 - dimethoxy - 2- (bis-β-hydroxyethyl)-aminotetraline*

5.75 g. of crude bis-hydroxyethylamine are obtained in the form of a colorless viscous oil from 5 g. of 1-(3′,4′,5′-trimethoxyphenyl) - 6,7 - dimethoxy - 2 - aminotetraline by the method described in Example 1(c). This crystallizes from methanol-ether after distillation in a high vacuum at 205–210°; M.P. 86–87° C.

(d) *1-(3′,4′,5′ - trimethoxyphenyl) - 6,7 - dimethoxy - 2- (bis-β-chloroethyl)-aminotetraline*

The solution of 5 g. of 1-(3′,4′,5′-trimethoxyphenyl)-6,7 - dimethoxy-2-(bis-β-hydroxyethyl)-aminotetraline in 50 cc. of absolute methylene chloride is heated to 60° for one hour, while stirring, after adding 5 cc. of thionyl chloride. After reducing the volume of the reaction mixture by evaporation in a vacuum, the crude hydrochloride of the nitrogen-mustard compound is dissolved in methanol, the major portion of the methanol is displaced with chloroform and the solution filtered through a column of 75 g. of aluminium oxide. The fraction which passes through in the chloroform constitutes the free nitrogen-mustard base, which is crystallized from alcohol or ether; M.P. 123–124°.

(e) *1-(3′,4′,5′ - trimethoxyphenyl) - 6,7 - dimethoxy - 2- (bis-β-chloroethyl)-aminotetraline hydrochloride*

5 g. of 1-(3′,4′,5′-trimethoxyphenyl)-6,7-dimethoxy-2-(bis-β-hydroxyethyl)-aminotetraline are converted into the hydrochloride as described in Example 1(d) and then reacted with thionyl chloride. The nitrogen-mustard compound crystallizes in the form of the hydrochloride from acetone or ether; M.P. 208–210° C.

*Free base*

Considerable losses occurred in attempting to recrystallize the hydrochloride from alcohol. The mother liquor contained the more readily soluble free base which crystallized from ether-petroleum ether or from benzene-cyclohexane as coarse crystals after prolonged standing; M.P. 123–124° C.

The free base can also be obtained by boiling a suspension of 1 g. of the hydrochloride in 50 cc. of benzene, whereupon the substance gradually goes into solution. When a clear solution has been obtained, it is reduced in volume by evaporation in a vacuum and the viscous residue is dissolved in ether. The base crystallizes on standing; M.P. 122–124° C.

*Hydrochloride*

The hydrochloride crystallized on passing gaseous hydrogen chloride into a solution of the free base in ether; M.P. 210–212° C.

EXAMPLE 3

*1-(3′,4′-dimethoxyphenyl)-5,6,7-trimethoxy-2-(bis-β-chloroethyl)-aminotetraline hydrochloride*

(a) *1-(3′,4′-dimethoxyphenyl) - 5,6,7 - trimethoxytetraline-2-carboxylic acid hydrazide*

The mixture of 10 g. of 1-(3′,4′-dimethoxyphenyl)-5,6,7-trimethoxytetraline-2-carboxylic acid ethyl ester in 10 cc. of alcohol is boiled under reflux for 4 hours with 25 cc. of hydrazine, and the hot solution then diluted with 25 cc. of water. The hydrazide crystallizes on cooling, giving colorless needles of M.P. 158–159° C.

(b) *1-(3′,4′ - dimethoxyphenyl) - 5,6,7 - trimethoxy - 2- aminotetraline*

12.5 g. of 1-(3′,4′-dimethoxyphenyl)-5,6,7-trimethoxy-tetraline-2-carboxylic acid hydrazide (30 millimoles) are dissolved at room temperature, while stirring, in a mixture of 50 cc. of glacial acetic acid and 45 cc. of 2 N hydrochloric acid. After cooling with ice, 31 cc. of N sodium nitrite are added, the solution poured on to 500 g. of ice after 10 minutes and the azide extracted with chloroform. The organic extracts are washed with ice-water and dilute potassium bicarbonate solution, the azide solution reduced in volume by careful evaporation in a vacuum and the crude azide taken up in 100 cc. of toluene. After adding 10 cc. of benzyl alcohol, the solution is boiled under reflux for 2 hours, the solvent and excess benzyl alcohol then removed in a vacuum and the residue crystallized from ethyl acetate-cyclohexane. The benzylurethane is recrystallized once from the same mixture; M.P. 147–148° C. Debenzylation is then carried out in 250 cc. of glacial acetic acid with 250 mg. of palladium charcoal in a hydrogen atmosphere at room temperature. The amine is isolated from the solution, after removing the catalyst and evaporating, by shaking with chloroform and dilute sodium hydroxide solution; it forms a colorless oil which distills at 190–195° in a high vacuum. The hydrochloride crystallizes from alcohol; M.P. 252–253° C.

(c) *1-(3′,4′-dimethoxyphenyl)-5,6,7-trimethoxy-2-(bis-β-hydroxyethyl)-aminotetraline*

12.5 g. of 1-(3′,4′-dimethoxyphenyl)-5,6,7-trimethoxy-2-aminotetraline are condensed with ethylene oxide by the method described in Example 1(c). The bis-hydroxyethylamine crystallizes from ether, M.P. 95–96° C.

(d) *1 - (3',4' - dimethoxyphenyl) - 5,6,7 - trimethoxy-2-(bis-β-chloroethyl)-aminotetraline hydrochloride*

2 g. of 1-(3',4'-dimethoxyphenyl)-5,6,7-trimethoxy-2-(bis-β-hydroxyethyl)-aminotetraline are converted into the hydrochloride as described in Example 1(d) and then reacted with thionyl chloride. The hydrochloride of the nitrogen-mustard compound crystallizes from methylene chloride-ether or methylene chloride-acetone; M.P. 166° C. The starting materials used in Examples 2 and 3, 1-(3',4',5' - trimethoxyphenyl) - 6,7-dimethoxytetraline-2-carboxylic acid methyl and ethyl esters and also 1-(3',4'-dimethoxyphenyl) - 5,6,7 - trimethoxytetraline - 2 - carboxylic acid ethyl ester are produced as follows:

*3,4,3'4',5'-pentamethoxybenzhydrylidene succinic acid*

36 g. of potassium (0.9 g. atom) are dissolved in 500 cc. of tert butanol by boiling under reflux in an inert nitrogen atmosphere, while excluding moisture. This takes 3 to 4 hours. A hot solution of 198 g. (0.6 mol) of 3,4,3',4',5'-pentamethoxybenzophenone and 156 cc. of succinic acid diethyl ester (0.9 mol) in 300 cc. of tert butanol is then added and the mixture boiled for 2 hours under reflux, while stirring. The solution is then neutralized with 300 cc. of 2 N hydrochloric acid, while cooling, the tert butanol evaporated off in a vacuum, the concentrate rendered acid to Congo red with dilute hydrochloric acid, shaken three times with 400 cc. of ether, the ether solution extracted 4 times with 250 cc. of 2 N sodium hydroxide, the united sodium hydroxide extracts boiled under reflux overnight, the alkaline solution rendered acid to Congo red with concentrated hydrochloric acid, while cooling and stirring in the presence of 500 cc. of chloroform, the Stobbe-acid is extracted with chloroform, the chloroform solution washed, dried and evaporated. The Stobbe-acid crystallizes from ethyl acetate, M.P. 172–175°.

*3,4,3',4',5'-pentamethoxybenzhydrylsuccinic acid*

A solution of 100 g. of 3,4,3',4',5'-pentamethoxybenzhydrylidene succinic acid in 1 litre of fine spirit is shaken in a 2 litres hydrogenating vessel at room temperature, after adding 4 g. of 10% palladium charcoal. After absorption of 5.9 litres of hydrogen, the catalyst is filtered off and the filtrate evaporated to dryness in a vacuum. The crude uncrystallized dihydro-Stobbe-acid, in the form of a colorless glass which can be powdered, is cyclized as such (100 g.).

*Cyclization of 3,4,3',4',5'-pentamethoxybenzhydrylsuccinic acid*

(a) *Anhydride.*—100 g. of crude 3,4,3',4',5'-pentamethoxybenzhydrylsuccinic acid are heated to boiling in 200 cc. of freshly distilled acetyl chloride for two hours while stirring. The clear solution is then reduced in volume by evaporation in a vacuum, the residue is shaken out with cold potassium bicarbonate solution and ice-water, dried and reduced in volume in a vacuum. The anhydride requires no further purification for the next step.

(b) *Friedel-Craft reaction.*—A solution of 60 cc. of stannictetrachloride (0.5 mol) in 100 cc. of nitrobenzene is added dropwise to the solution of the crude anhydride (approx. 95 g.) in 300 cc. of nitrobenzene, while cooling with ice and stirring. The mixture is stirred overnight and allowed to thaw, whereupon 400 cc. of dilute hydrochloric acid are added and extraction effected with 500 cc. of ether. The organic phase is shaken out once with dilute hydrochloric acid and twice with water and then exhaustively extracted with dilute sodium hydroxide, the alkaline extract is rendered acid to Congo red, the acid portions are taken up in chloroform, the chloroform solution is washed, dried and reduced in volume by evaporation. The crude cyclization product is resolved into its components by fractional crystallization. The sparingly soluble 1-(3',4',5' - trimethoxyphenyl) - 4 - oxo - 6,7 - dimethoxy-tetraline-2-carboxylic acid is the first to crystallize from methanol; M.P. 239–241°. After recrystallizing from alcohol; M.P. 242–243°. The mother liquor, after evaporation in a vacuum, is taken up in ethyl acetate, whereupon the isomeric 1 - (3',4' - dimethoxyphenyl)-4-oxo-5,6,7-trimethoxy-tetraline-2-carboxylic acid, which has a somewhat lower temperature crystallizes; M.P. 170–172°. The keto-acid, after purification by recrystallization from ethyl acetate, melts at 173–174°.

*1-(3',4',5'-trimethoxyphenyl)-4-oxo-6,7-dimethoxy-tetraline-2-carboxylic acid methyl ester*

A suspension of 25 g. of 1-(3',4',5'-trimethoyyphenyl)-4-oxo-6,7-dimethoxy-tetraline-2-carboxylic acid in 300 cc. of methanol and 15 cc. of concentrated sulphuric acid is boiled overnight under reflux while stirring. The methyl ester crystallizes from the hot solution on cooling. After standing for some time, the ester is filtered off, washing is carried out with methanol and drying effected at 80° in a vacuum; M.P. 171–172°.

*1-(3',4',5'-trimethoxyphenyl)-4-oxo-6,7-dimethoxy-tetraline-2-carboxylic acid ethyl ester*

The ethyl ester, produced by esterification of 1-(3',4',5'-trimethoxyphenyl) - 4 - oxo - 6,7 - dimethoxy-tetraline-2-carboxylic acid with alcohol and concentrated sulphuric acid crystallizes from ethanol, M.P. 144–145°.

*1-(3',4'-dimethoxyphenyl)-4-oxo-5,6,7-trimethoxy-tetraline-2-carboxylic acid ethyl ester*

The ethyl ester produced in the usual manner by esterification of the keto-acid with alcohol and concentrated sulphuric acid crystallizes from alcohol; M.P. 132–133°.

*1-(3',4',5'-trimethoxyphenyl)-6,7-dimethoxy-tetraline-2-carboxylic acid ethyl ester*

Catalytic hydrogenation of 1 - (3',4',5' - trimethoxyphenyl) - 4-oxo-6,7-dimethoxy-tetraline-2-carboxylic acid-ethyl ester, carried out in a similar manner, produces the reduction product quoted in the title. M.P. 110–111° from methanol.

*1-(3',4'-dimethoxyphenyl)-5,6,7-trimethoxytetraline-2-carboxylic acid ethyl ester*

This is formed by catalytic hydrogenation of 1-(3',4'-dimethoxyphenyl) - 4 - oxo-5,6,7-trimethoxy-tetraline-2-carboxylic acid ethyl ester. The compound could not be crystallized. It can be distilled in a bulb tube; B.P. 170°/0.001 mm. Hg. The crude compound can be used for subsequent hydrazinolysis.

EXAMPLE 4

*1-(3',4'-dimethoxyphenyl)-6,7-dimethoxy-2-(bis-β-chloroethyl)-aminotetraline*

(a) *1 - (3',4' - dimethoxyphenyl) - 6,7 - dimethoxytetraline-2-carboxylic acid hydrazide*

The suspension of 40 g. of 1-(3',4'-dimethoxyphenyl)-6,7-dimethoxytetraline-2-carboxylic acid methyl ester in 80 cc. of alcohol and 80 cc. of hydrazine (anhydrous) is boiled under reflux for two hours (oil bath 130°). A clear solution is produced, from which the hydrazide crystallizes on cooling. After filtering and washing with alcohol, 37.5 g. of pure product of M.P. 179–180° are obtained. The M.P. shows no change on recrystallizing from alcohol.

The 1-(3',4'-dimethoxyphenyl)-6,7-dimethoxytetraline-2-carboxylic acid methyl ester is produced as follows:

*1-(3',4'-dimethoxyphenyl)-4-oxo-6,7-dimethoxy-tetraline-2-carboxylic acid methyl ester*

The suspension of 60 g. of 1-(3',4'-dimethoxyphenyl)-4-oxo-6,7-dimethoxytetraline-2-carboxylic acid in 600 cc. of methanol and 60 cc. of concentrated sulphuric acid is boiled under reflux for 8 hours while stirring (oil bath, 100°). The methyl ester crystallizes on cooling the hot solution. The ester is filtered off after standing for some time, it is washed with methanol and the 1-(3',4'-dimethoxyphenyl) - 4 - oxo-6,7-dimethoxytetraline-2-carboxylic acid methyl ester dried at 80° in a vacuum; M.P. 146–147°. 50 g. of this are dissolved in 500 cc. of glacial acetic acid and hydrogenated with 5 g. of 10% palladium charcoal in a hydrogen atmosphere at room temperature, in a sulphonation flask which is pitted with a Vibro stirrer. After hydrogenation, the solution is freed of catalyst and evaporated in a vacuum and the hydrogenation product 1 - (3',4'-dimethoxyphenyl)-6,7-dimethoxytetraline-2-carboxylic acid methyl ester crystallized from methanol. M.P. 98–100°.

(b) *1 - (3',4' - dimethoxyphenyl) - 6,7 - dimethoxy - 2-aminotetraline*

10 g. of 1-(3',4'-dimethoxyphenyl)-6,7-dimethoxytetraline-2-carboxylic acid hydrazide (26 millimoles) are dissolved in a mixture of 40 cc. of glacial acetic acid and 40 cc. of 2 N-hydrochloric acid, while stirring. While cooling with ice, 27 cc. of N sodium nitrite are added dropwise and the reaction solution poured on 400 g. of ice after 5 minutes, the azide extracted with chloroform, the chloroform extracts shaken out with ice-water, cold potassium bicarbonate solution and ice-water, dried and the chloroform solution reduced in volume by evaporation in a vacuum in a rotary evaporator at temperatures under 30°. The crude azide is then taken up in 50 cc. of toluene and boiled under reflux for two hours after adding 10 cc. of benzyl alcohol. (Oil bath: 140°.) After removing the volatile components by evaporation in a vacuum, the benzyl urethane is crystallized from alcohol; M.P. 175–176°.

For debenzylation, the benzyl urethane is dissolved in 200 cc. of glacial acetic acid, 1 g. of 10% palladium charcoal is added and the mixture is hydrogenated at 50° under atmospheric pressure in a sulphonation flask, fitted with a Vibro stirrer.

On completion of hydrogen absorption, the catalyst is filtered off, the filtrate reduced in volume by evaporation in a vacuum and the base isolated from the residue by shaking out with dilute sodium hydroxide solution and chloroform. The amine crystallizes from alcohol; M.P. 151–152°. The *hydrochloride* crystallizes from water-alcohol; M.P. 273–274° (decomposition).

(c) *1 - (3',4' - dimethoxyphenyl)-6,7-dimethoxy-2-(bis-β-hydroxyethyl)-aminotetraline*

5 g. of 1 - (3',4'-dimethoxyphenyl)-6,7-dimethoxy-2-aminotetraline are reacted with ethylene oxide as described in Example 1(c). The bis-hydroxyethylamine derivative, after purification by distillation (B.P. 240–245°/0.01 mm. Hg), crystallizes from ether and is recrystallized from methylene chloride-ether; M.P. 114–115°.

(d) *1-(3',4' - dimethoxyphenyl)-6,7-dimethoxy-2-(bis-β-chloroethyl)-aminotetraline*

5 g. of 1 - (3',4'-dimethoxyphenyl)-6,7-dimethoxy-2-(bis-β-hydroxyethyl)-aminotetraline are dissolved in 100 cc. of methylene chloride. After addition of 5 cc. of thionyl chloride, the mixture is heated for 2 hours to 60°, while stirring. After evaporation of the light-yellow reaction solution in a vacuum, the *hydrochloride* of the nitrogen-mustard compound crystallizes from acetone; M.P. 195–197°, with decomposition.

The *free base* is obtained from the hydrochloride by shaking out with chloroform and water. The nitrogen-mustard base crystallizes from ether and is recrystallized from methylene chloride/ether; M.P. 113–114°.

EXAMPLE 5

*1-phenyl-2-(bis-β-chloroethyl)-aminotetraline*

(a) *1-phenyltetraline-2-carboxylic acid hydrazide*

The mixture of 44 g. of 1-phenyltetraline-2-carboxylic acid methyl ester, 90 cc. of alcohol and 90 cc. of hydrazine is boiled under reflux for 2 hours (oil bath 130°); the clear colorless solution is then reduced in volume by evaporating in a vacuum, and the hydrazide crystallized from methanol; M.P. 150–151°.

The 1-phenyltetraline-2-carboxylic acid methyl ester, used as starting material, is produced as follows:

*1-phenyl-4-oxo-tetraline-2-carboxylic acid methyl ester*

The suspension of 100 g. of 1-phenyl-4-oxo-tetraline-2-carboxylic acid in 1000 cc. of methanol and 100 cc. of concentrated sulphuric acid is boiled under reflux overnight while stirring (oil bath 100°). The methyl ester crystallizes on cooling the hot solution. After leaving to stand for some time, the ester is filtered off, washed with methanol and the 1-phenyl-4-oxo-tetraline-2-carboxylic acid methyl ester dried in a vacuum at 80°; M.P. 119–120°.

50 g. of 1-phenyl-4-oxo-tetraline-2-carboxylic acid methyl ester are dissolved in 500 cc. of glacial acetic acid and hydrogenated with 6 g. of 10% palladium charcoal in a hydrogen atmosphere at room temperature in a sulphonation flask, fitted with a Vibro stirrer. After hydrogenation, the solution, from which catalyst has been removed, is evaporated in a vacuum and the crude hydrogenation product distilled; B.P. 130°/0.01 mm. Hg. The distilled 1-phenyltetraline-2-carboxylic acid methyl ester crystallizes on standing; M.P. 72–73°.

(b) *1-phenyl-2-aminotetraline*

31.9 g. of 1-phenyltetraline-2-carboxylic acid hydrazide (0.12 mole) are dissolved in 360 cc. of glacial acetic acid while stirring at room temperature, 450 cc. of N methanesulphonic acid are added and the mixture is cooled to 0°. While stirring vigorously, 120 cc. of N sodium nitrite are added dropwise and the azide extracted after 15 minutes. The chloroform extracts are shaken out with ice water, cold $KHCO_3$ solution and ice water, and dried and the chloroform solution is reduced in volume in a vacuum at temperatures of below 30° in a rotary evaporator. The crude azide is then taken up in 150 cc. of toluene and boiled for 3 hours under reflux after adding 30 cc. of benzyl alcohol (oil bath 140°). After evaporating the volatile components in a vacuum, the benzylurethane is crystallized from alcohol; M.P. 115–117°. After recrystallization from alcohol, the M.P. is 119–120°.

In order to debenzylate the benzylurethane, it is dissolved in 300 cc. of glacial acetic acid and hydrogenated, in a flask, fitted with Vibro stirrer, under standard conditions, after adding 1.5 g. of 10% palladium charcoal. After hydrogenation the catalyst is filtered off, the filtrate concentrated in a vacuum and the residue distilled in a bulb tube; B.P. 120°/0.01 mm. Hg. The colorless distilled amine crystallizes on standing and can be recrystallized from petroleum ether; M.P. 67–68°. The *hydrochloride* crystallizes from alcohol; M.P. 280–281°; decomposition.

(c) *1-phenyl-2-(bis-β-hydroxyethyl)-aminotetraline*

20 g. of 1-phenyl-2-aminotetraline are reacted with ethylene oxide as described in Example 1(c). The bis-hydroxyethyl derivative crystallizes on cooling the reaction solution. After leaving to stand for some time, the product is filtered off, washed with methanol and dried at 80° in a vacuum; M.P. 134–135°.

(d) *1-phenyl-2-(bis-β-chloroethyl)-aminotetraline*

10 g. of 1-phenyl-2-(bis-β-hydroxyethyl)-aminotetraline are dissolved in 100 cc. of methylene chloride. After adding 10 cc. of thionyl chloride, the mixture is heated to 60° for two hours, while stirring. The light yellow reaction solution is then reduced in volume by evaporating in a vacuum, the residue is taken up in chloroform, the chloroform solution is shaken out with water, dried and reduced in volume in a vacuum. The nitrogen-mustard compound crystallizes from ether-petroleum ether; M.P. 80–81°.

What is claimed is:
1. A compound selected from the group consisting of compounds of the formula

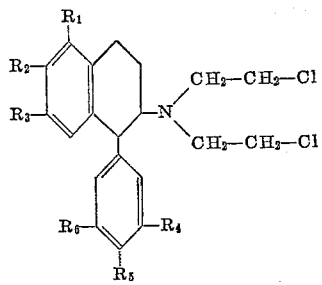

wherein when $R_1$ is hydrogen, $R_2$, $R_3$, $R_4$, $R_5$ and $R_6$ are each hydrogen when $R_1$ is hydrogen, $R_2$ and $R_3$ are each methoxy or together methylenedioxy, $R_4$ and $R_5$ are each methoxy and $R_6$ is hydrogen or methoxy, when $R_1$, $R_2$ and $R_3$ are each methoxy $R_4$ and $R_5$ are methoxy and $R_6$ is hydrogen, and their pharmaceutically acceptable acid addition salts.

2. 1-(3′,4′,5′ - trimethoxyphenyl)-6,7-methylenedioxy-2-(bis-β-chloroethyl)-aminotetraline.

3. 1 - (3′,4′,5′ - trimethoxyphenyl) - 6,7 - dimethoxy-2-(bis-β-chloroethyl)-aminotetraline.

4. 1 - (3′,4′ - dimethoxyphenyl) - 5,6,7 - trimethoxy-2-(bis-β-chloroethyl)-aminotetraline.

5. 1-(3′,4′-dimethoxyphenyl) - 6,7 - dimethoxy-2-(bis-β-chloroethyl)-aminotetraline.

6. 1-phenyl-2-(bis-β-chloroethyl)-aminotetraline.

No references cited.

WALTER A. MODANCE, *Primary Examiner.*

N. S. MILESTONE, *Assistant Examiner.*